Figure 1:
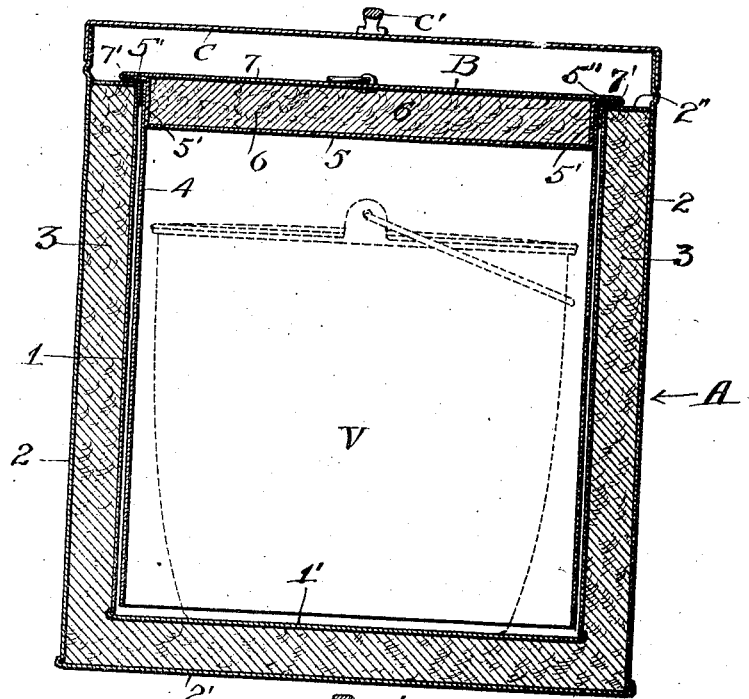

No. 876,858.                                            PATENTED JAN. 14, 1908.
W. C. CLINGEN.
FIRELESS COOKER.
APPLICATION FILED APR. 15, 1907.

2 SHEETS—SHEET 1.

Witnesses:                                              Inventor,
                                                        William C. Clingen

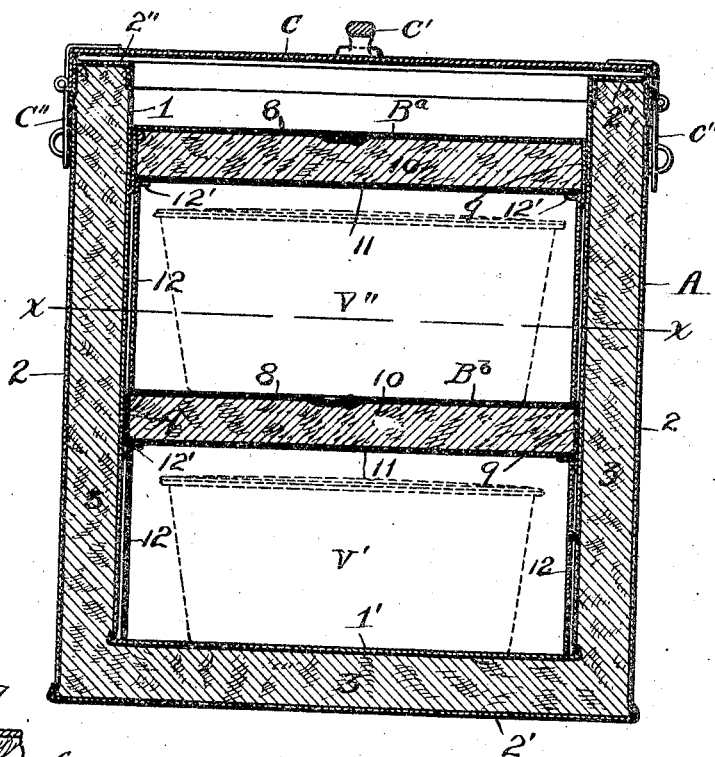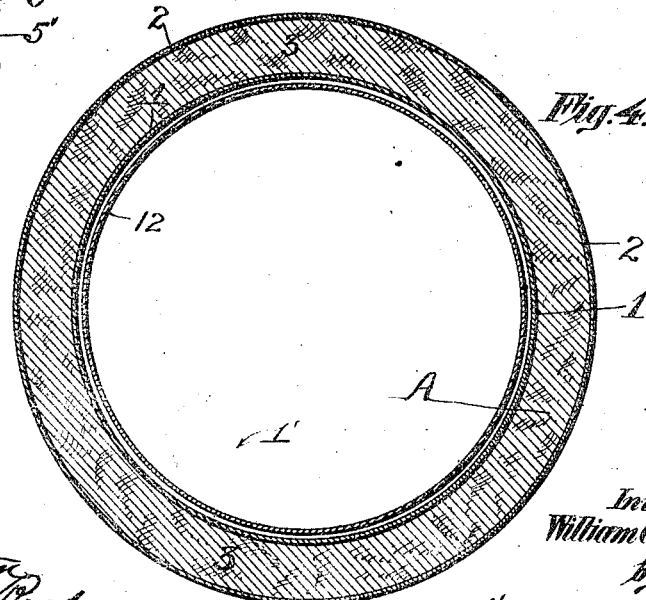

UNITED STATES PATENT OFFICE.

WILLIAM C. CLINGEN, OF LAKE BLUFF, ILLINOIS, ASSIGNOR TO THE FIRELESS COOKER COMPANY, OF CHICAGO, ILLINOIS, A CORPORATION OF ILLINOIS.

FIRELESS COOKER.

No. 876,858.　　　Specification of Letters Patent.　　　Patented Jan. 14, 1908.

Application filed April 15, 1907. Serial No. 368,268.

*To all whom it may concern:*

Be it known that I, WILLIAM C. CLINGEN, a citizen of the United States, and a resident of Lake Bluff, Lake county, Illinois, have invented a certain new, useful, and Improved Fireless Cooker, of which the following is a full, clear, and exact description, such as will enable others skilled in the art to which it appertains to make and use the same.

My invention relates to cooking apparatus and has special reference to improvements in devices of the class known as fireless cookers. A fireless cooker in its simplest form comprises nothing more than a non-conducting or heat-retaining receptacle adapted to contain a vessel holding food that has been previously partially cooked. In using these devices the housewife takes the vessel containing the partially cooked food from the stove and placing it within the "cooker," quickly closes the latter. The thick non-conducting walls of the cooker serve to retain the heat and within a few hours the food is found to have been thoroughly cooked by the retained heat.

The object of my invention is to provide a fireless cooker of simple and economical construction and which shall more effectually retain the heat of the partially cooked food placed therein, thereby insuring the complete cooking of the food and keeping it hot until ready to serve.

With these objects in view my invention consists generally in a fireless cooker that comprises a receptacle which is open at the top and which has heat retaining walls, in combination with a bell or trap adapted to be placed in and to close the top of said receptacle over the vessel containing the partially cooked hot food, the cooking of which is to be completed; the construction being such that the vapors from the food are prevented from escaping from the closed receptacle and furthermore maintained in the condition of vapor for a long period of time through the prevention or retardation of the radiation of heat from the receptacle.

Further my invention consists in a fireless cooker, of the foregoing description, provided with a bell which has a heat retaining top or upper end. And further, my invention consists in an arrangement or construction of bells or traps which permits several vessels to be placed in a single open-topped fireless cooker.

My invention also consists in various details of construction and in combinations of parts all as hereinafter fully described and particularly pointed out in the claims.

The invention will be more readily understood by reference to the accompanying drawings forming a part of this specification and in which:—

Figure 2:
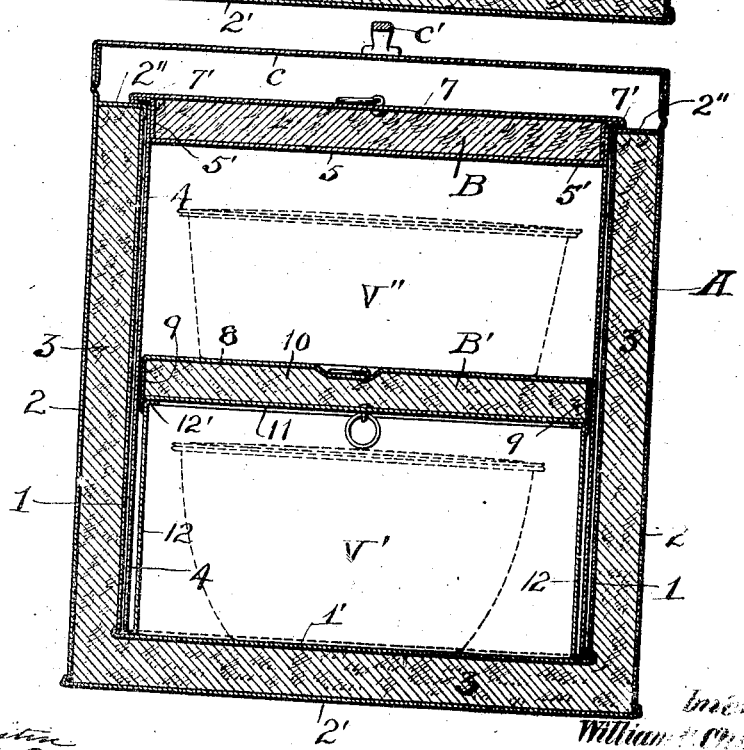

Figure 1 is a vertical section of a fireless cooker embodying my invention; Fig. 2 is a similar view showing a "cooker" receptacle divided into several compartments; Fig. 3 is a similar view, of a modification of the cooker shown in Fig. 2; Fig. 4 is a cross section on the line X—X of Fig. 3; and Fig. 5 is a sectional detail, upon an enlarged scale illustrating the preferred construction of the top of the bell or trap, shown in Figs. 1 and 2.

In the drawings A represents the main portion or body of my improved fireless cooker. This is closed at the bottom and open at the top to receive a kettle or other vessel containing food, as indicated by dotted lines in Fig. 1.

B is the complementary part of the cooker comprising the closure for the part A. The two parts or members A and B complete the device, but for convenience in handling it, I prefer to provide it with an outside cover, C, having a handle, C', and fastened upon the body portion, A, by suitable means, such as the hasps, C'', of Fig. 3. The body A comprises the metallic receptacle proper, 1, having a bottom, 1', and the outer receptacle or jacket, 2, having a bottom 2'. The space between the receptacles 1 and 2 is filled with insulating material, such as mineral wool or asbestos 3. The upper end of the annular space is closed by a ring 2''. After the non-conducting packing, 3, has been inserted, all the joints are soldered to make the space air tight.

If desired the upper edge of the jacket, 2, may extend above the top or edge, 2'', to receive the cover, C, or the upper edge may be cut down as shown in Fig. 3, in which case the outer cover, C, fits down over the jacket, 2.

If desired the cover may be entirely dispensed with, as the closure, B, effectually prevents radiation of heat from the receptacle; making the cover, C, unnecessary except for the better finish and appearance which it gives the device.

I prefer that the receptacle, 1, shall be cylindrical in form, but it is obvious that it may partake of other forms in horizontal cross section. I make the closures, B, in several forms to adapt them to different uses and have herein shown three of these forms.

Referring to Fig. 1, it will be noted that the closure, B, comprises a bell or trap which is open at the bottom and closed at the top. The sides of the bell or trap comprise the sheet metal cylinder, 4, the upper end of which is closed by the disk or plate 5. The joint between the parts 4 and 5 is closed by means of solder or the like, making the bell steam tight at the top. In this particular instance (Fig. 1), and in order that the top of the bell may be insulated, I prefer to form the plate as a shallow pan having upturned flanges, 5', and outturned flanges, 5''. The upper edges of the cylinder, 4, are, conveniently, soldered to the peripheral flange, 5', of the top plate, 5. The shallow pan is filled with insulating material such as mineral wool, 6, and the top is closed by a plate or disk, 7, the edges, 7', of which are formed or seamed around the flange, 5''. The details of this structure are best shown in Fig. 5. The flange thus formed upon the top of the bell rests upon the top or upper edge of the body, A, closing the joint between the body, A, and the closure, B. The cylindrical portion, 4, of the bell extends nearly, or quite, to the bottom of the receptacle. The operation of the fireless cooker illustrated in Fig. 1 may now be described and such description will facilitate the description of the remaining figures of the drawing.

When about to use the fireless cooker, the housewife removes the cover, C, and also the closure, B. Then the vessel, as V, containing the partially cooked hot food is taken from the stove and is placed in the receptacle, 1. As quickly as possible, the bell or closure, B, is pushed down into the receptacle over the vessel therein. It will be obvious that as the bell is forced downward in the receptacle it will expel the cold air therefrom until the flange of the closure seats itself upon the top of the body, A. The heat of the vessel, V, and its contents quickly imparts the same temperature to the small body of air surrounding the vessel within the bell or trap, but the heat is prevented from escaping by the insulated side, bottom and top walls of the closed receptacle.

The vapor which escapes from the vessel together with the heated air within the closed receptacle tends to rise within the bell or trap and finding no escape at the top of the bell is confined in the closed receptacle. It will be clear that little, if any, of the heated vapor will find its escape at the bottom of the bell, notwithstanding the fact that the bell does not fit the receptacle tightly. Furthermore, the gradual fall of temperature within the receptacle ultimately causes condensation of vapor therein and the water of condensation forms a water seal between the lower edges of the bell and the adjacent cylindrical wall of the receptacle.

A fireless cooker of this construction will retain its heat for a great length of time and in this particular is superior to all other devices of the kind with which I am familiar.

It sometimes occurs that the housewife wishes to cook two or more things at a time and to permit this, I may provide the device illustrated in Fig. 1 with a smaller trap or bell, B', arranged to fit within the bell, B, as shown in Fig. 2. In such case one vessel, V', may be placed within the smaller trap or bell, B', after which a second vessel V'', may be placed on the top of the smaller, or lower trap, B'. Thereupon the larger trap will be lowered into the receptacle the sides thereof passing down at the sides of the smaller bell or trap. It should be noted that the condensation in both chambers effects an accumulation of water at the lower ends of the traps, to effectually seal the same.

The device illustrated in Fig. 3 is like unto the device of Fig. 1, but is provided with two small bells or traps, $B^a$, and $B^b$, like unto the trap B' of Fig. 2. The traps, or bells, $B^a$, and $B^b$, are of the same diameter, and one rests upon the top of the other. Each is adapted to contain a vessel, as indicated by dotted lines. The traps $B^a$, $B^b$, and B' are formed, or constructed, in the same way; each comprising a top part, 8, having a depending flange, 9, and filled with non-conducting material, 10, the latter being held in place by the bottom plate, 11. The side or cylindrical portion of the trap has an inturned flange 12' at the top fitting within the flange 9 of the top plate. When thus assembled the parts are secured by means of rivets and solder, making a steam tight joint at the top of the bell. Hollow disks which form the tops of the bells or traps illustrated, are in effect metallic cushions filled with insulating material. These possess a distinct advantage over the ordinary cloth covered cushions hitherto employed, as they may be readily cleaned, and are therefore more sanitary. In this connection I desire that it shall be understood that the bell, or trap, of my cushion, may be a simple metallic part adapted to close the receptacle, over the contained vessel.

As various modifications of my invention will readily suggest themselves to one skilled in the art, I do not confine the invention to the specific structures herein shown and described.

Having thus described my invention I claim as new and desire to secure by Letters Patent:

1. A fireless cooker, comprising a receptacle, open at the top and closed at the bottom, to contain a food vessel, in combination with a vapor bell or trap, open at the bottom and closed at the top, to inclose the vessel within the receptacle and also close the top of said receptacle, the bottom and sides of said receptacle and the top of said bell being insulated to retard the radiation of heat from the food, whereby the food vapors are retained and maintained within the closed vessel for a long period of time.

2. A fireless cooker, comprising a metal receptacle, open at the top and closed at the bottom, to contain a food vessel, in combination with a metal vapor retaining bell or trap, open at the bottom and closed at the top, said bell fitting within said receptacle and closing the top thereof, and a larger metal receptacle whereto the upper edges of the first mentioned receptacle are joined, the space between said receptacles being filled with insulating or nonconducting material and the top of said bell containing non-conducting material; whereby the vapors from hot food within the receptacle are retained and maintained therein for a long period of time, substantially as and for the purpose specified.

3. A fireless cooker, comprising a metal receptacle having heat retaining bottom and side walls, said receptacle being closed at the bottom and open at the top to receive a food vessel, in combination with a vapor retaining bell having a closed, heat retaining top, which closes the top of said receptacle, the sides or walls of said bell extending to the bottom of said receptacle, inclosing the food vessel therein, substantially as and for the purpose specified.

4. A fireless cooker, comprising a metal receptacle, having heat retaining bottom and side walls and open at the top, to contain a food vessel, in combination with a metal bell extending to the bottom of said receptacle and having a closed, heat retaining top, provided with a horizontal flange resting upon the top of said receptacle and closing the annular space between the same and the top of the bell, substantially as and for the purpose specified.

5. A fireless cooker, comprising a metal receptacle having heat retaining bottom and side walls and open at the top to receive, a food vessel, in combination with a metal bell or trap fitting said receptacle and having a closed, nonconducting or heat retaining top which closes the top of said receptacle, and a like metal bell of less height than the first mentioned bell, fitting within the same and also provided with a closed nonconducting top, substantially as and for the purpose specified.

In testimony whereof, I have hereunto set my hand, this 12th day of April, 1907, in the presence of two subscribing witnesses.

WILLIAM C. CLINGEN.

Witnesses:
  A. W. NELSON,
  JOHN R. LEFEVRE.